United States Patent
Liu et al.

(10) Patent No.: US 10,075,712 B2
(45) Date of Patent: Sep. 11, 2018

(54) METHOD OF MOTION VECTOR AND BLOCK VECTOR RESOLUTION CONTROL

(71) Applicant: HFI Innovation Inc., Zhubei, Hsinchu County (TW)

(72) Inventors: Shan Liu, San Jose, CA (US); Xiaozhong Xu, Fremont, CA (US)

(73) Assignee: HFI INNOVATION INC., Zhuebei, Hsinchu County (TW)

( * ) Notice: Subject to any disclaimer, the term of this patent is extended or adjusted under 35 U.S.C. 154(b) by 0 days.

(21) Appl. No.: 15/520,593

(22) PCT Filed: Nov. 19, 2015

(86) PCT No.: PCT/CN2015/094983
§ 371 (c)(1),
(2) Date: Apr. 20, 2017

(87) PCT Pub. No.: WO2016/078599
PCT Pub. Date: May 26, 2016

(65) Prior Publication Data
US 2017/0310961 A1    Oct. 26, 2017

Related U.S. Application Data

(60) Provisional application No. 62/182,685, filed on Jun. 22, 2015, provisional application No. 62/126,969, (Continued)

(51) Int. Cl.
*H04N 7/12* (2006.01)
*H04N 19/107* (2014.01)
(Continued)

(52) U.S. Cl.
CPC ......... *H04N 19/107* (2014.11); *H04N 19/139* (2014.11); *H04N 19/174* (2014.11);
(Continued)

(58) Field of Classification Search
CPC .. H04N 19/107; H04N 19/523; H04N 19/577; H04N 19/196; H04N 19/174; H04N 19/139; H04N 19/573
(Continued)

(56) References Cited

U.S. PATENT DOCUMENTS

| 6,980,596 B2 | 12/2005 | Wang et al. | |
|---|---|---|---|
| 2004/0146108 A1* | 7/2004 | Hsia | H04N 19/139 375/240.16 |
| 2015/0195527 A1* | 7/2015 | Zhou | H04N 19/52 375/240.02 |

FOREIGN PATENT DOCUMENTS

WO    WO 2011/120221 A1    10/2011

OTHER PUBLICATIONS

International Search Report dated Feb. 29, 2016, issued in application No. PCT/CN2015/094983.
(Continued)

*Primary Examiner* — Allen Wong
(74) *Attorney, Agent, or Firm* — McClure, Qualey & Rodack, LLP (57) ABSTRACT

A method of video coding using coding modes including IntraBC mode (Intra-block copy mode) and inter prediction mode is disclosed. In one embodiment, when adaptive motion vector resolution is selected to allow adaptive use of integer resolution or fractional-pel resolution, a resolution indicator having a value corresponding to using integer resolution for all motion vectors and all block vectors is signaled in the current. In another embodiment, if a coded block is coded in the inter prediction mode or the IntraBC mode, the coded MV or BV is converted to a converted MV or BV having fractional-pel resolution if a resolution indicator for the coded block specifies integer resolution. The
(Continued)

system then stores the converted MV or BV for encoding or decoding of subsequent blocks.

17 Claims, 4 Drawing Sheets

Related U.S. Application Data filed on Mar. 2, 2015, provisional application No. 62/082,222, filed on Nov. 20, 2014.

(51) Int. Cl.
    *H04N 19/139*     (2014.01)
    *H04N 19/174*     (2014.01)
    *H04N 19/573*     (2014.01)
    *H04N 19/196*     (2014.01)
    *H04N 19/577*     (2014.01)
    *H04N 19/523*     (2014.01)

(52) U.S. Cl.
    CPC ......... *H04N 19/196* (2014.11); *H04N 19/523* (2014.11); *H04N 19/573* (2014.11); *H04N 19/577* (2014.11)

(58) Field of Classification Search
    USPC .................................................. 375/240.13
    See application file for complete search history.

(56)               References Cited

OTHER PUBLICATIONS

Zhou, Y., et al..; "RCE1 Subtest 1-Motion Vector Resolution Control;" Joint Collaborative Team on Video Coding (JCT-VC) of ITU-T SG 16 WP 3 and ISO/IEC JTC 1/SC 29/WG 11; Mar.-Apr. 2014; pp. 1-5.

Xu, X., et al.; "On unification of intra block copy and inter-picture motion compensation;" Joint Collaborative Team on Video Coding (JCT-VC) of ITU-T SG 16 WG 3 and ISO/IEC JTC 1/SC 29/WG 11; Jan. 2014; pp. 1-14.

Xu, X., et al.; "On stored decoded motion vector resolution;" oint Collaborative Team on Video Coding (JCT-VC) of ITU-T SG 16 WP 3 and ISO/IEC JTC 1/SC 29/WG 11; Jun. 2015; pp. 1-7.

\* cited by examiner

METHOD OF MOTION VECTOR AND BLOCK VECTOR RESOLUTION CONTROL

CROSS REFERENCE TO RELATED APPLICATIONS

The present invention claims priority to U.S. Provisional Patent Application, Ser. No. 62/082,222, filed on Nov. 20, 2014, U.S. Provisional Patent Application, Ser. No. 62/126,969, filed on Mar. 2, 2015, and U.S. Provisional Patent Application, Ser. No. 62/182,685, filed on Jun. 22, 2015. The present invention is also related to U.S. Provisional Patent Application, Ser. No. 61/942,819, filed on Feb. 21, 2014, U.S. Provisional Patent Application, Ser. No. 61/954,181, filed on Mar. 17, 2014, U.S. Provisional Patent Application, Ser. No. 62/044,385, filed on Sep. 1, 2014. The U.S. Provisional Patent Applications are hereby incorporated by reference in their entireties.

TECHNICAL FIELD

The present invention relates to video coding using coding modes including Intra-block copy (IntraBC) mode and inter prediction mode. In particular, the present invention relates to techniques to handle adaptive motion vector resolution blocks in a slice coded in the inter prediction mode and block vectors of the Intra-block copy (IntraBC) coding mode for screen content coding or video coding.

BACKGROUND

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Figure 1:
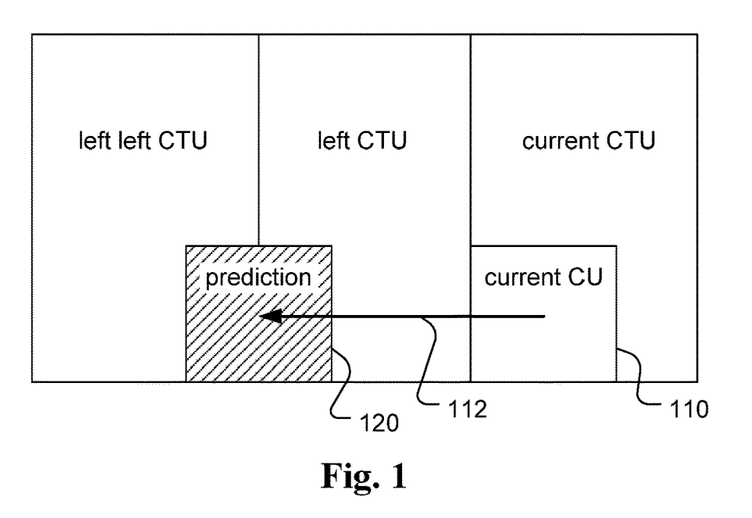
FIG. 1 illustrates an example of Intra motion compensation according to the Intra-block copy (IntraBC) mode, where a horizontal displacement vector is used.

In the current development of screen content coding for High Efficiency Video Coding (HEVC) standard, some tools have been adopted due to their improvements in coding efficiency for screen contents. For Intra blocks, Intra prediction according to the conventional approach is performed using prediction based on reconstructed pixels from neighboring blocks. Intra prediction may select an Intra Mode from a set of Intra Modes, which include a vertical mode, horizontal mode and various angular prediction modes. For HEVC screen content coding, a new Intra coding mode, named Intra-block copy (IntraBC) has been used. The IntraBC technique that was originally proposed by Budagavi in *AHG8. Video coding using Intra motion compensation*, Joint Collaborative Team on Video Coding (JCT-VC) of ITU-T SG 16 WP 3 and ISO/IEC JTC 1/SC 29/WG 11, 13th Meeting: Incheon, KR, 18-26 Apr. 2013, Document: JCTVC-M0350 (hereinafter JCTVC-M0350). An example according to JCTVC-M0350 is shown in FIG. 1, where a current coding unit (CU, 110) is coded using Intra MC (motion compensation). The prediction block (120) is located from the current CU and a displacement vector (112). In this example, the search area is limited to the current CTU (coding tree unit), the left CTU and the left-left CTU. The prediction block is obtained from the already reconstructed region. Then, the displacement vector, also named block vector (BV), and residual for the current CU are coded. It is well known that the HEVC adopts CTU and CU block structure as basic units for coding video data. Each picture is divided into CTUs and each CTU is reclusively divided into CUs. During prediction phase, each CU may be divided into multiple blocks, named prediction units (PUs) for performing prediction process. After prediction residue is formed for each CU, the residue associated with each CU is divided into multiple blocks, named transform units (TUs) to apply transforms.

In JCTVC-M0350, the Intra MC is different from the motion compensation used for Inter prediction in at least the following areas:

MVs are restricted to be 1-D for Intra MC (i.e., either horizontal or vertical) while Inter prediction uses 2-D motion estimation.

Binarization is fixed length for Intra MC while Inter prediction uses exponential-Golomb.

Intra MC introduces a new syntax element to signal whether the MV is horizontal or vertical.

Based on JCTVC-M0350, some modifications are disclosed by Pang, et al. in *Non-RCE3: Intra Motion Compensation with 2-D Mvs*, Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013, Document: JCTVC-N0256 (hereinafter JCTVC-N0256). Firstly, the Intra MC is extended to support 2-D MVs, so that both MV components can be non-zero at the same time. This provides more flexibility to Intra MC than the original approach, where the MV is restricted to be strictly horizontal or vertical.

In JCTVC-N0256, two MV coding methods are disclosed:

Method 1: Motion vector prediction. The left or above MV is selected as the MV predictor and the resulting motion vector difference (MVD) is coded. A flag is used to indicate whether the MVD is zero. When MVD is not zero, exponential-Golomb codes of the 3rd order are used to code the remaining absolute level of the MVD. Another flag is used to code the sign.

Method 2: NoMotion vector prediction. The MV is coded using the exponential-Golomb codes that are used for MVD in HEVC.

Another difference disclosed in JCTVC-N0256 is that the 2-D Intra MC is further combined with the pipeline friendly approach:

1. No interpolation filters are used,
2. MV search area is restricted. Two cases are disclosed:
   a. Search area is the current CTU and the left CTU or
   b. Search area is the current CTU and the rightmost 4 column samples of the left CTU.

Figure 2:
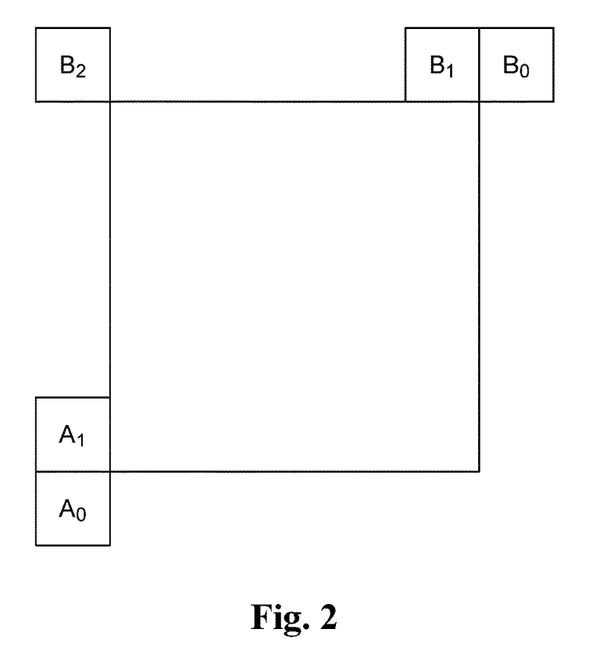
FIG. 2 illustrates an example of neighboring block configuration used to derive motion vector predictor for IntraBC mode.

In JCTVC-R0309 (Pang et al., *Non-SCCE1: Combination of ICTVC-R0185 and JCTVC-R0203*, Joint Collaborative Team on Video Coding (JCT-VC) of ITU-T SG 16 WP 3 and ISO/IEC JTC 1/SC 29/WG 11, 18th Meeting: Sapporo, JP, 30 Jun.-9 Jul. 2014, Document: JCTVC-R0309), the BV coding is modified to use the neighboring BVs and coded BVs as BV predictor (BVP). The BVP technique has been adopted in SCM 2.0 (HEVC Screen Content Coding Test Model 2.0). The BV predictor is derived similar to the AMVP (advanced motion vector prediction) scheme in HEVC. The predictor candidate list is constructed by first checking the available of block vector from the spatial neighboring blocks A1 and B1 according to a priority order as shown in FIG. 2. If one or both of the spatial neighboring blocks contain no block vector, one or both of the last two coded BVs are used to fill into the block vector candidate list. The replacement block vectors are initialized with (−2*CU_width, 0) and (−CU_width, 0). To avoid the need of line buffer, the above BV outside the current CTU is considered unavailable. The last two coded BVs are reset to (0, 0) for each CTU to prevent the data dependency.

Figure 3A:
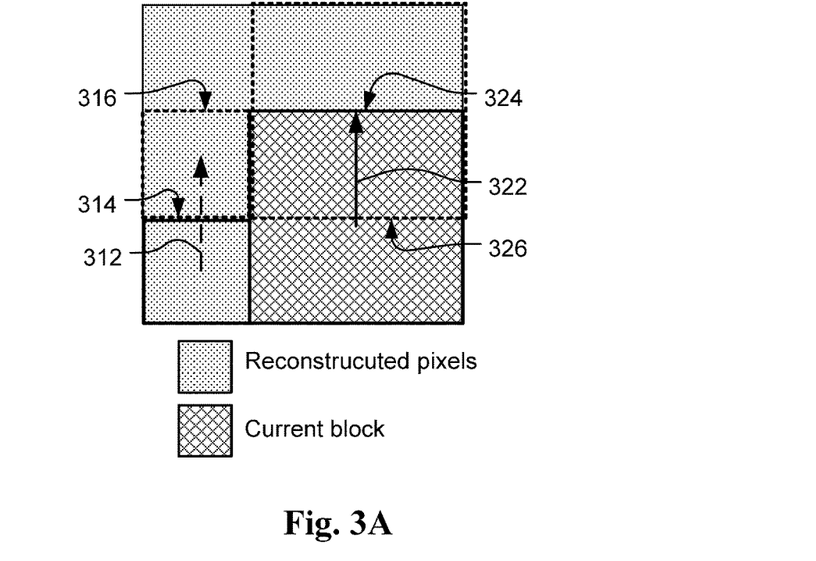
FIGS. 3A-3B illustrate examples of invalid block vector predictor.
Figure 3B:
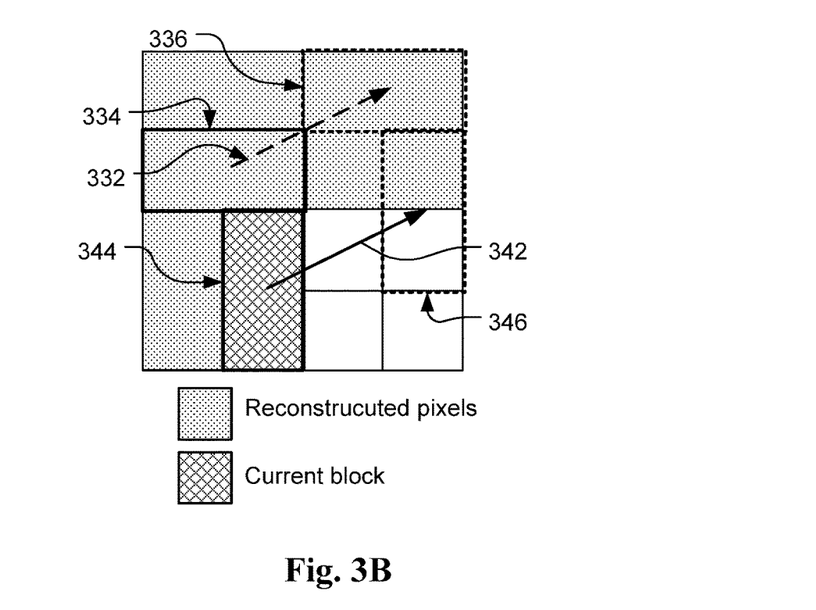

In U.S. Provisional Patent Application, Ser. No. 62/044,385, a method of Merge mode for IntraBC mode is disclosed, where the Merge index points to an IntraBC coded Merge candidate. In some cases, a BVP may be pointing to an invalid block. FIG. 3A illustrates one example of BVP pointing to an invalid block. In FIG. 3A, the block vector predictor 312 points from previous processed block 314 shown as a solid square to reference block 316 shown as a dashed square. If the current block vector 322 uses block vector 312 as a predictor, the current block 324 shown as a solid square would point to reference area 326 shown as a dashed square. As shown in FIG. 3A, half of the reference block 326 for the current block is in the current block, which is not reconstructed yet. FIG. 3B illustrates another example of BVP pointing to an invalid block. In FIG. 3B, the block vector predictor 332 points from previous processed block 334 shown as a solid rectangle to reference block 336 shown as a dashed rectangle. If the current block vector 342 uses block vector 332 as a predictor, the current block 344 shown as a solid rectangle would point to reference area 346 shown as a dashed rectangle. As shown in FIG. 3B, half of the reference block 346 is in the area that is not processed yet.

Therefore, some constraints should be imposed on the block vector predictor to assure a valid block vector for the current IntraBC block. In particular, the x-axis component and/or y-axis component of the block vector predictor should meet some requirements.

Recently, a technique called adaptive motion vector resolution has been proposed to HEVC SCC (screen content coding) by Li et al., in JCTVC-S0085 (Li et al., *Adaptive motion vector resolution for screen content*, Joint Collaborative Team on Video Coding (JCT-VC) of ITU-T SG 16 WP 3 and ISO/IEC JTC 1/SC 29/WG 11, 19th Meeting: Strasbourg, FR, 17-24 Oct. 2014, Document: JCTVC-S0085), where a slice level flag is used to indicate whether the resolution of MV for the inter coded PUs are at integer accuracy or ¼-pel accuracy. In U.S. Provisional Patent Applications, Ser. No. 61/942,819 and Ser. No. 61/954,181, the current picture is treated as one of the reference pictures for IntraBC operations. This current picture is placed into the reference picture list or to replace one existing reference picture in the list.

As mentioned before, in the current SCM (HEVC Screen Content Coding Test Model), the block vectors always use integer resolution while motion vectors can be integer resolution and quarter-pel resolution. There are differences in the derivation process between the block vector and motion vector. The corresponding text description of BV and MV derivation is listed in Tables 1A, 1B and 1C as follows:

TABLE 1A

When predFlagLX is equal to 1 and the picture with index refIdx from reference picture list LX of the slice is not the current picture, the luma motion vector mvLX is derived as follows:
  uLX[ 0 ] = ( mvpLX[ 0 ] + mvdLX[ 0 ] + $2^{16}$ ) % $2^{16}$
  mvLX[ 0 ] = ( uLX[ 0 ] >= $2^{15}$ ) ? ( uLX[ 0 ] − $2^{16}$ ) : uLX[ 0 ]
  uLX[ 1 ] = ( mvpLX[ 1 ] + mvdLX[ 1 ] + $2^{16}$ ) % $2^{16}$
  mvLX[ 1 ] = ( uLX[ 1 ] >= $2^{15}$ ) ? ( uLX[ 1 ] − $2^{16}$ ) : uLX[ 1 ]

TABLE 1B

When predFlagLX is equal to 1 and the reference picture is the current picture, the luma motion vector mvLX is derived as follows:
  uLX[ 0 ] = ( ( ( mvpLX[ 0 ] >> 2 ) + mvdLX[ 0 ] ) << 2 + $2^{16}$ ) % $2^{16}$
  mvLX[ 0 ] = ( uLX[ 0 ] >= $2^{15}$ ) ? ( uLX[ 0 ] − $2^{16}$ ) : uLX[ 0 ]
  uLX[ 1 ] = ( ( ( mvpLX[ 0 ] >> 2 ) + mvdLX[ 0 ] ) << 2 + $2^{16}$ ) % $2^{16}$
  mvLX[ 1 ] = ( uLX[ 1 ] >= $2^{15}$ ) ? ( uLX[ 1 ] − $2^{16}$ ) : uLX[ 1 ]

The resulting values of mvLX[0] and mvLX[1] as specified above will always be in the range of −$2^{15}$ to $2^{15}$−1, inclusive. In Table 1A and Table 1B, predFlagLX is a flag indicating whether the prediction of a corresponding block may be derived from a reference picture list L0 or a reference picture list L1. When predFlagLX is equal to 1, it indicates that the prediction of a corresponding block may be derived from a reference picture list L0 or a reference picture list L1. Table 1A corresponds to the derivation of motion vectors for inter prediction coded blocks. Table 1B corresponds to the derivation of block vectors for IntraBC coded blocks. Since the integer-valued BV are stored in quarter-pel resolution, the BV has to be right-shifted by 2 to derive the integer value before BV is used as a predictor as shown in Table 1B. In the above tables, mvpLX[0] and mvpLX[1] correspond to the motion/block vector components associated with the motion/block vector predictor, and mvdLX[0] and mvdLX[1] correspond to the motion/block vector differences between the current motion/block vector and the motion/block vector predictor in list LX, where X is equal to 0 or 1.

Before applying interpolation, the derived motion vector is clipped when the integer resolution is selected for an inter prediction coded block as shown in Table 1C.

TABLE 1C

When use_integer_mv_flag is equal to 1 and the reference index refIdxLX is not equal to currPic, mvLX and mvCLX (where X equals to 0 or 1) are modified as follows:
  mvLX = Clip3( − $2^{15}$, $2^{15}$ − 1, mvLX << 2 )
  mvCLX = Clip3( − $2^{15}$, $2^{15}$ − 1, mvCLX << 2 )

The resolution of motion vector is indicated by "use_integer_mv_flag". The syntax table for this flag is incorporated in the slice header as shown below.
  if(motion_vector_resolution_control_idc==2)
     use_integer_mv_flag.

The syntax, motion_vector_resolution_control_idc is signaled in sequence parameter set (SPS) to indicate the motion vector resolution modes. Three modes are defined. When the mode is 0, all motion vectors in the sequence are at ¼ pixel resolution (i.e., quarter-pel resolution). When the mode is 1, all of the motion vectors in the sequence are encoded at full pixel resolution (i.e., integer resolution). Furthermore, motion_vector_resolution_control_idc equal to 2 specifies that use_integer_mv_flag may be signaled at slice header to select integer or quarter-pel resolution adaptively. The flag, use_integer_mv_flag equal to 1 specifies that the motion vector resolution is integer in the decoding process of current slice. use_integer_mv_flag equal to 0 specifies that the motion vector resolution is quarter-pixel (i.e., quarter-pel) in the decoding process of current slice. When not present, the value of use_integer_mv_flag is inferred to be equal to motion_vector_resolution_control_idc.

When use_integer_mv_flag is equal to 1, all motion vectors in the slice will be decoded in integer resolution, and stored in integer-pel resolution. When use_integer_mv_flag is equal to 0, all motion vectors in the slice will be decoded in quarter-pel resolution and stored in quarter-pel resolution. When integer MV is used for a slice, all the stored MVs will be left shifted by two, before motion compensation (interpolation) stage. An issue may occur in the deblocking filter stage, where MV is used as a parameter for boundary strength (BS) decision. It is required that the MV of a block in deblocking is in quarter-pel resolution. In addition, when the stored MV is used as a predictor for MV prediction, the predicted MV and its predictor may not have the same resolution. Therefore, a resolution mismatch issue exists due to adaptive motion vector resolution.

In High Level Syntax, the current picture is placed after all short term reference pictures and all other long term reference pictures during the initialization of reference picture list construction. The related descriptions are listed below for List 0. Similar process can be applied for List 1.

At the beginning of the decoding process for each slice, the reference picture list RefPicList0 for P slices and, both reference picture lists RefPicList0 and RefPicList1 for B slices are derived as follows:

TABLE 2

At the beginning of the decoding process for each slice, the reference picture lists RefPicList0 and RefPicList1 (used for B slices) are derived as follows:

NumRpsCurrTempList0 is set to
Max( num_ref_idx_l0_active_minus1 + 1,
NumPicTotalCurr ) and the list RefPicListTemp0 is constructed
as follows:
rIdx = 0
while( rIdx < NumRpsCurrTempList0 ) {
for( i = 0; i < NumPocStCurrBefore && rIdx < NumRpsCurrTempList0;
rIdx++, i++ )
    RefPicListTemp0[ rIdx ] = RefPicSetStCurrBefore[ i ]
for( i = 0; i < NumPocStCurrAfter && rIdx < NumRpsCurrTempList0;
rIdx++, i++ )
    RefPicListTemp0[ rIdx ] = RefPicSetStCurrAfter[ i ]
for( i = 0; i < NumPocLtCurr && rIdx < NumRpsCurrTempList0;
rIdx++, i++ )
    RefPicListTemp0[ rIdx ] = RefPicSetLtCurr[ i ]
if( curr_pic_as_ref_enabled_flag )
    RefPicListTemp0[ rIdx++ ] = currPic
}

In Table 2, curr_pic_as_ref_enabled_flag equal to 1 specifies a picture referring to the SPS (sequence parameter set) may be included in a reference picture list of the picture itself. curr_pic_as_ref_enabled_flag equal to 0 specifies that a picture referring to the SPS is never included in any reference picture list of the picture itself. When not present, the value of curr_pic_as_ref_enabled_flag is inferred to be equal to 0.

After the initialization, the reference picture list RefPicList0 is constructed as follows:
for(rIdx=0;    rIdx<=num_ref_idx_l0_active_minus1;
    rIdx++)
    RefPicList0[rIdx]=ref_pic_list_modification_flag_l0 ?
        RefPicListTemp0[list_entry_l0[rIdx]]: RefPicListTemp0[rIdx].

However, when the number of active reference pictures (i.e., num_ref_idx_l0_active_minus1+1) is smaller than the number of reference pictures in the list (NumRpsCurrTempList0) associated with the RefPicListTemp0 array storing the current picture, the current picture may not be included in the active reference picture list.

In a coding system based on the existing HEVC, there is an issue associated with Decoded Picture Buffer (DPB) management for IntraBC. When IntraBC is used, the reconstructed portion of current picture may be used as a reference picture to predict current picture. This reference picture for IntraBC is referred as "the unfiltered version of current picture". On the other hand, the version of current picture that will eventually go through filtering operations such as deblocking and SAO is referred to the filtered version of current picture.

A reference picture has to be in Decoded Picture Buffer (DPB) in order to be used by a current picture. The size of DPB is constrained to be MaxDpbSize, which is derived as shown in Table 3.

TABLE 3 if( PicSizeInSamplesY <= ( MaxLumaPs >>2 )
    MaxDpbSize = Min( 4 * maxDpbPicBuf, 16 )
else if( PicSizeInSamplesY <= ( MaxLumaPs >> 1 )
    MaxDpbSize = Min( 2 * maxDpbPicBuf, 16 )
else if( PicSizeInSamplesY <= ( ( 3 * MaxLumaPs ) >> 2 ) )
    MaxDpbSize = Min( ( 4 * maxDpbPicBuf ) / 3, 16 )
Else
    MaxDpbSize = maxDpbPicBuf In Table 3, MaxLumaPs is the maximum luma picture size and maxDpbPicBuf is is the maximum DPB size such as 6. However, there are some issues in the current DPB management operations when IntraBC is used (current picture as reference picture).

It is desirable to develop techniques to resolve issues associated with adaptive motion vector resolution when blocks in a slice are coded in the IntraBC mode and inter prediction mode.

SUMMARY

A method of video coding using coding modes including IntraBC mode (Intra-block copy mode) and inter prediction mode for a picture is disclosed. In one embodiment, when adaptive motion vector resolution is selected to allow adaptive use of integer resolution or fractional-pel resolution, a resolution indicator having a value corresponding to using integer resolution for all motion vectors and all block vectors is signaled in the current slice. Furthermore, if the current picture is the only reference picture for the current slice, the resolution indicator in a coded bitstream associated with the current slice must have the value corresponding to using integer resolution for all motion vectors and all block vectors in the current slice. When the current picture referring to a SPS (sequence parameter set) is allowed to be included in a reference picture list of the current picture, a resolution control indicator in the SPS must not set to a value to allow the fractional-pel resolution for a sequence containing the current slice. Alternatively, the signaling of the resolution indicator can be skipped if the current picture is the only reference picture for the current slice. An exemplary resolution indicator may correspond to a syntax element use_integer_mv_flag, where use_integer_mv_flag equal to 1 specifies the integer resolution and use_integer_mv_flag equal to 0 specifies fractional-pel resolution.

In another embodiment, the system receives a coded MV (motion vector) or BV (block vector) for a coded block. If the coded block is coded in the inter prediction mode or the IntraBC mode, the coded MV or BV is converted to a converted MV or BV having fractional-pel resolution for intermediate storage and computation if a resolution indicator for the coded block specifies integer resolution. The system then stores the converted MV or BV for encoding or decoding of subsequent blocks. The conversion to fractional-pel resolution may be implemented by left-shifting the coded MV or BV by N bits, such as N=2. The converted MV or BV may be further clipped before the converted MV or BV is stored. When the converted MV or BV is used as a predictor for a current MV or BV associated with an inter prediction or IntraBC coded current block, the converted MV or BV will be converted to integer resolution first before the converted MV or BV is used as a predictor. The converted MV or BV can be converted to integer resolution by right-shifting by N bits, such as N=2. Again, after right-shifting by N bits, the result may be clipped to a valid range before it is used as a predictor for the current MV or BV.

In yet another embodiment, if the current block is coded in the IntraBC mode or the Inter prediction mode, the current vector is encoded or decoded using a same resolution regardless whether the current vector corresponds to one MV or one BV, or the current block according to the current vector is encoded or decoded using the same resolution regardless whether the current vector corresponds to one MV or one BV. Furthermore, the current vector can be converted to fractional-pel resolution if a resolution indicator for the current block specifies integer resolution and the converted vector is stored for encoding or decoding of subsequent blocks or subsequent vectors.

In still yet another embodiment, if the current picture is the only reference picture for the current picture, a resolution indicator is determined for the current picture implicitly without signaling the resolution indicator, where the resolution indicator specifies whether to use the integer resolution or the fractional-pel resolution for motion vectors and block vectors in the current picture. The resolution indicator can be inferred to have a value specifying the integer resolution.

In still yet another embodiment, a single resolution is determined for both the MVs and the BVs of the IntraBC coded blocks and the Inter prediction coded blocks in a same slice according to a resolution indicator and a resolution control indicator, where the resolution control indicator specifies fixed resolution or adaptive resolution, and the resolution indicator specifies whether to use the integer resolution or the fractional-pel resolution for the MVs when the resolution control indicator specifies the adaptive resolution. The resolution indicator may correspond to a first syntax element, use_integer_mv_flag and the resolution control indicator may correspond to a second syntax element, motion_vector_resolution_control_idc. For example, the single resolution is always determined as the integer resolution if a current picture is an only reference picture for the slice. In one example, the resolution indicator is set to specify to use the integer resolution. Alternatively, the signaling of the resolution indicator is skip if the current picture is the only reference picture for the slice.

DETAILED DESCRIPTION

As mentioned above, adaptive motion vector resolution may be used for inter prediction. In a coding system with coding modes including both inter prediction mode and IntraBC mode, a motion vector (MV) or block vector (BV) may have different resolution from a MV or BV predictor. In order to overcome this issue, various techniques are disclosed here.

Signaling the Use of Integer Vector

In one embodiment, for each slice, a flag is used to signal whether the MV in this slice uses integer resolution. When the current picture is treated as a reference picture, the current picture may be the only reference picture in some case during encoding or decoding the current picture (e.g., the very first picture of a sequence). In this case, according to this embodiment, the use of integer MV is no longer signaled if the current picture is the only reference picture for the currently encoded/decoded picture. Instead, the use of integer MV is inferred. In other words, in this case, integer MV (BV) is always used.

Interaction Between BV/MV Prediction

In the conventional MV prediction, if a block in a spatial/temporal candidate position is coded in IntraBC mode, this position is regarded as unavailable for the MV prediction purpose. An embodiment of the present invention uses the BV from a spatial/temporal neighboring candidate position, which is coded in IntraBC mode, to predict the MV of the current block.

Similarly, for BV prediction, if a block in a spatial/temporal candidate position is coded in Inter mode, this position is regarded as unavailable for the BV prediction purpose. An embodiment of the present invention uses the MV from a spatial/temporal neighboring candidate position, which is coded in IntraBC mode, to predict the BV of the current block.

If the use of integer only MV in the current slice is disabled, the representation of the MV is at sub-pel accuracy. In this scenario, an embodiment of the present invention uses scaling process for predicting BV or MV using BV or MV. For example, the MV from a neighboring block may be used to predict the BV of the current block. In this case, the MV is right shifted by N bits to convert to the integer accuracy before being used to predict the BV of the current block. N is an integer value such as N=2 to convert quarter-pel resolution to integer resolution. In another example, the BV from a neighboring block is used to predict the MV of the current block. In this case, the BV is left shifted by N to adjust for the sub-pel accuracy before predicting the MV of current block. N is an integer value such as N=2 to convert quarter-pel resolution to integer resolution.

In the MV prediction process, if the reference picture of a neighboring block is different from the reference picture of the current block, the MV predictor from this neighboring block may need to be scaled before it is used for prediction. When using a MV to predict a BV, the MV scaling method is applied according to an embodiment of the present invention. The distance between the reference picture and the current picture needs to be considered. The distance can be evaluated according to the POC (picture order count) different between two pictures. In one embodiment, before predicting the current BV, the MV is scaled as if the reference picture of the current IntraBC coded block is the one that is right next to the current picture in terms of the POC value. In this case, the "DiffPicOrderCnt" value representing the difference in POC value between two pictures is assigned. The currPocDiff representing the POC difference between the current picture and its "reference picture" is set to be +1 or −1, instead of 0. In one embodiment, if the POC of the reference picture for the neighboring block is larger than the POC of the picture containing the neighboring block, currPocDiff is set to be +1. Otherwise, if the POC of the reference picture for the neighboring block is smaller than the POC of the picture containing the neighboring block, currPocDiff is set to be −1.

This value (i.e., +1 or −1) is used to calculate the scaling value (distScaleFactor) in the MV scaling process. In the case that the reference picture of the neighboring block is just next to the current picture in terms of the POC value, the scaling process for the MV is not necessary. In another embodiment, no scaling is needed for the MV pointing to any reference pictures.

A constraint can be imposed when using a BV to predict a MV. For example, the BV can only be used to predict the MV of the current block when the reference picture of the current block is the first reference picture in each reference list (i.e., index=0 in L0 and/or L1). Otherwise, the neighboring block will be marked as "unavailable" for MV prediction.

A constraint can be imposed when using a MV to predict a BV. For example, the MV can only be used when the reference picture of the neighboring block is the first one in each reference list (i.e., index=0 in L0 and/or L1). Otherwise, the neighboring block will be marked as "unavailable" for BV prediction.

BV Clipping

When a BV is used as the predictor for the BV of the current block, the BV predictor is clipped to a valid value if it was not. The clipping can be extended to the case where a MV is used as the predictor for the BV of the current block. If the predictor does not point to a valid reference block area, a clipping operation is applied to clip the MV to a valid value. The invalid reference block area may correspond to the case that part of the reference block is not available or outside the current CTU boundary. Note that the MV here can be the original MV used by the neighboring block for motion compensation, or the scaled MV according to embodiments of the present invention mentioned above.

In the 20th JCT-VC meeting in Geneva, February 2015, it was agreed that the IntraBC is unified with Inter coding mode as described in JCTVC-T0227 (Pang et al., *Non-CE2 Test 1: Intra block copy and inter signalling unification*, Joint Collaborative Team on Video Coding (JCT-VC) of ITU-T SG 16 WP 3 and ISO/IEC JTC 1/SC 29/WG 11, 20th Meeting: Geneva, CH, 10-18 Feb. 2015, Document: JCTVC-T0227). According to JCTVC-T0227, the current picture is treated as a reference picture and inserted into one or both reference picture lists. Block vector prediction and coding are performed the same as Inter motion vector prediction and coding. The unification simplifies the codec design. However there are some remaining issues. One issue arises since the block vectors in the current SCM (HEVC Screen Content Coding Test Model) are always using integer resolution while motion vectors can use both integer resolution and quart-pel resolution adaptively. The selection between quarter-pel and integer resolutions under adaptive motion vector resolution is switched at slice level as described in JCTVC-S0085. In order to overcome this issue, several solutions are disclosed in this application described as follows.

Adaptive Motion/Block Vector Resolution Control

In the current SCC (screen content coding) draft standard, a flag "use_integer_mv_flag" is signaled in each slice header to specify whether motion vectors in this slice are integer or quart-pel resolution. The syntax and semantics are as shown in Table 4.

TABLE 4

| slice_segment_header( ) { | Note |
|---|---|
| first_slice_segment_in_pic_flag | |
| ...... | |
| if( motion_vector_resolution_control_idc = = 2 ) | (4-1) |
| use_integer_mv_flag | (4-2) |
| } | |
| ...... | |
| byte_alignment( ) | |
| } | |

In Table 4, use_integer_mv_flag equal to 1 specifies that the motion vector resolution is integer in the decoding process of current slice. use_integer_mv_flag equal to 0 specifies that the motion vector resolution is qual-pixel in the decoding process of current slice. When not present, the value of use_integer_mv_flag is inferred to be equal to motion_vector_resolution_control_idc. motion_vector_resolution_control_idc is signaled in sequence parameter set (SPS) to indicate the motion vector resolution control modes. Three modes are defined. When the mode is 0, the motion vectors are encoded at ¼ pixel resolution (i.e., quarter-pel resolution). When the mode is 1, all of the motion vectors in the slices that refer to the SPS are encoded at full pixel resolution (i.e., integer resolution). Furthermore, motion_vector_resolution_control_idc equal to 2 specifies that adaptive quarter-pel and integer resolution. In this case, use_integer_mv_flag may be signaled at slice header as indicated by notes (4-1) and (4-2) to select integer or quarter-pel resolution. When motion_vector_resolution_control_idc equals to 0 or 1, use_integer_mv_flag is not signaled at slice header.

While use_integer_mv_flag is used as an example to select the integer or quarter-pel resolution, the present invention is applicable to any resolution indicator selecting between the integer resolution and any fractional-pel resolution.

In the first embodiment of adaptive motion/block vector resolution control, the resolution of block vectors in a slice is determined by the values of "use_integer_mv_flag" and "motion_vector_resolution_control_idc" regarding whether to use integer or quart-pel. In other words, the resolution of block vectors in a slice is the same as the resolution of regular motion vectors in the same slice.

In order to optimize the coding process, the encoder should always set "use_integer_mv_flag" to be 1 (i.e., setting the block/motion vector resolution to integer) when the current picture is the only reference picture for this slice.

In the second embodiment of adaptive motion/block vector resolution control, the above encoder behavior requirement is normative or bitstream conformant. In other words, it is required to set "use_integer_mv_flag" to a value of 1 (i.e., setting the block/motion vector resolution to integer)

when current picture is the only reference picture for this slice. Otherwise the bitstream is not valid.

In the third embodiment of adaptive motion/block vector resolution control, signaling "use_integer_mv_flag" is skipped when current picture is the only reference picture for this slice. The value of "use_integer_mv_flag" is inferred to be 1 (i.e., setting the block/motion vector resolution to integer).

An exemplary slice header syntax incorporating an embodiment of the present invention is shown in Table 5.

TABLE 5

| slice_segment_header( ) { | Note |
|---|---|
| first_slice_segment_in_pic_flag | |
| ...... | |
| if( motion_vector_resolution_control_idc == 2 && | |
| !( curr_pic_as_ref_enabled_flag && | (5-1) |
| slice_type == P &&num_ref_idx_l0_active_minus1 == 0 ) ) | |
| use_integer_mv_flag | |
| } | |
| ...... | |
| byte_alignment( ) | |
| } | |

In Table 5, additional condition (i.e., &&!(curr_pic_as_ref_enabled_flag && slice_type==P &&num_ref_idx_l0_active minus1==0)) is added as shown in note (5-1). This additional condition corresponds to that the current picture is the only reference picture for this slice.

Another exemplary slice header syntax incorporating an embodiment of the present invention is shown in Table 6.

TABLE 6

| slice_segment_header( ) { | Note |
|---|---|
| first_slice_segment_in_pic_flag | |
| ...... | |
| if( motion_vector_resolution_control_idc == 2 | (6-1) |
| && !( curr_pic_as_ref_enabled_flag | |
| && slice_type == B | |
| &&num_ref_idx_l0_active_minus1 == 0 | |
| && num_ref_idx_l1_active_minus1 == 0)) | |
| use_integer_mv_flag | |
| } | |
| ...... | |
| byte_alignment( ) | |
| } | |

In Table 6, additional condition (i.e., && !(curr_pic_as_ref_enabled_flag && slice type==B && num_ref_idx_l0_active_minus1==0 && num_ref_idx_l1_active_minus1==0)) is added as shown in note (6-1). This additional condition corresponds to that the current picture is the only reference picture for this slice. In Table 6, the definition of use_integer_mv_flag is the same as that in Table 5. However, when not present, the value of use_integer_mv_flag is derived as follows:

If the current picture is the only reference picture for the current slice,
the value of use_integer_mv_flag is inferred to be equal to 1,
Otherwise,
the value of use_integer_mv_flag is inferred to be equal to motion_vector_resolution_control_idc.

In fourth embodiment of adaptive motion/block vector resolution control, an enable flag is used for each of the reference pictures for the current slice to signal the MV resolution when the reference picture is used for a PU (prediction unit) for motion compensation (including IntraBC). For a particular reference picture, if this flag is on, then for all the blocks inside the current picture, the MV/BV will use integer resolution when the blocks inside the current picture use this picture as the reference. After decoding the MV/BV, the vector should be left shifted by two to restore the quarter-pel accuracy. When this flag is off, then for all the blocks inside the current picture, the MV/BV will use quarter-pel resolution when the blocks use this picture as the reference. In one embodiment, the resolution indication flag of the above reference picture can be applied to reference pictures in either list 0 or list 1 or both lists. In another embodiment, each reference picture will have a resolution indication flag regardless which reference list the reference picture is placed into. When the IntraBC reference picture is used as the reference picture for the current slice, this resolution indication flag for the IntraBC reference picture does not need to be signaled. In this case, the resolution indication flag can be inferred to be on (i.e., using integer resolution).

For the above method, a SPS level flag can be used to signal whether this method will be applied.

MV/BV Resolution Unification

As mentioned above, in the current SCC (screen content coding) draft standard, a flag "use_integer_mv_flag" is signaled in each slice header to specify whether the motion vectors in this slice are in integer (i.e., use_integer_mv_flag=1) or quarter-pel resolution (i.e., use_integer_mv_flag=0). While the MV resolution is adaptively controlled by the flag "use_integer_mv_flag", the BV is always in integer resolution according to existing standard. In order to overcome this issue, various techniques to harmonize or unify the MV/BV resolution are disclosed herein.

In the first embodiment of BV/MV resolution harmonization/unification, the decoded motion vectors are always stored in fractional-pel resolution regardless the value of the setting of use_integer_mv_flag. For example, when this embodiment is applied to the existing HEVC, the decoded motion vectors will be always stored in quarter-pel resolution. The conversion to quarter-pel resolution can be based on the left-shift operation. For example, the decoded motion vector can be left shifted by N bits (e.g. N=2 for HEVC) to be at fractional-pel resolution when the integer resolution flag is ture. The left-shifted motion vector will be further processed by clipping to ensure that the result is within a valid range, such as $-2^{15}$ and $2^5-1$ for HEVC. The left-shifted and clipped motion vectors corresponding to the quarter-pel resolution will be stored and used by subsequent blocks for MV/BV prediction. When the integer resolution flag is false, the decoded motion vector will go through clipping process to ensure that the result is within a valid range, such as $-2^{15}$ and $2^{15}-1$ for HEVC. The clipped motion vectors will be stored in quarter-pel resolution. Since the clipping is performed during the derivation of MV, there is no need to do the extra clipping operation prior to motion compensation (interpolation). Furthermore, when a stored vector is used to predict an integer MV, the predictor should be right shifted, such as by 2 for HEVC, to be in integer-pel resolution before the prediction is applied.

An exemplary BV/MV resolution unification incorporating an embodiment of the present invention is shown as shown in Table 7A and Table 7B.

TABLE 7A

When predFlagLX is equal to 1 and the picture with index refIdx from reference picture list LX of the slice is not the current picture, the luma motion vector mvLX is derived as follows:

uLX[ 0 ] = ( ( ( ( mvpLX[ 0 ] >> ( 2*use_integer_mv_flag ) ) + mvdLX[ 0 ] )
        << (2*use_integer_mv_flag ) ) + $2^{16}$ ) % $2^{16}$
mvLX[ 0 ] = ( uLX[ 0 ] >= $2^{15}$ ) ? ( uLX[ 0 ] − $2^{16}$ ) : uLX[ 0 ]
uLX[ 1 ] = ( ( ( ( mvpLX[ 1 ] >> ( 2*use_integer_mv_flag ) ) + mvdLX[ 1 ] )
        << (2*use_integer_mv_flag ) ) + $2^{16}$ ) % $2^{16}$
mvLX[ 1 ] = ( uLX[ 1 ] >= $2^{15}$ ) ? ( uLX[ 1 ] − $2^{16}$ ) : uLX[ 1 ]

TABLE 7B

When predFlagLX is equal to 1 and the reference picture is the current picture, the luma motion vector mvLX is derived as follows:

uLX[ 0 ] = ( ( ( mvpLX[ 0 ] >> 2 ) + mvdLX[ 0 ] ) << 2 + $2^{16}$ ) % $2^{16}$
mvLX[ 0 ] = ( uLX[ 0 ] >= $2^{15}$ ) ? ( uLX[ 0 ] − $2^{16}$ ) : uLX[ 0 ]
uLX[ 1 ] = ( ( mvpLX[ 0 ] >> 2 ) + mvdLX[ 0 ] ) << 2 + $2^{16}$ ) % $2^{16}$
mvLX[ 1 ] = ( uLX[ 1 ] >= $2^{15}$ ) ? ( uLX[ 1 ] − $2^{16}$ ) : uLX[ 1 ]

The resulting values of mvLX[0] and mvLX[1] as specified above will always be in the range of $-2^{15}$ to $2^{15}-1$, inclusive.

According to the existing standard, the clipping will be performed before applying interpolation. However, based on embodiments of the present invention, the clipping process for the conventional HEVC as shown in Table 1C will not be performed. In other words, the process is skipped.

The syntax in Table 7A is related to MV derivation for use_integer_mv_flag equal to 0 (i.e., quarter-pel resolution) and 1 (i.e., integer resolution). As shown in Table 7A, the "right-shifting by 2" operation will not be performed quarter-pel resolution since the value of use_integer_mv_flag is equal to 0 (i.e., (2*use_integer_mv_flag)=0). Table 7B is related to BV derivation, which is the same as the BV derivation for the conventional HEVC as shown in Table 1B.

Another exemplary BV/MV resolution unification incorporating an embodiment of the present invention is shown as shown in Table 8A and Table 8B.

TABLE 8A

When predFlagLX is equal to 1 and the picture with index refIdx from reference picture list LX of the slice is not the current picture and use_integer_mv_flag is equal to 0, the luma motion vector mvLX is derived as follows:

uLX[ 0 ] = ( mvpLX[ 0 ] + mvdLX[ 0 ] + $2^{16}$ ) % $2^{16}$
mvLX[ 0 ] = ( uLX[ 0 ] >= $2^{15}$ ) ? ( uLX[ 0 ] − $2^{16}$ ) : uLX[ 0 ]
uLX[ 1 ] = ( mvpLX[ 1 ] + mvdLX[ 1 ] + $2^{16}$ ) % $2^{16}$
mvLX[ 1 ] = ( uLX[ 1 ] >= $2^{15}$ ) ? ( uLX[ 1 ] − $2^{16}$ ) : uLX[ 1 ]

TABLE 8B

When predFlagLX is equal to 1 and the reference picture is the current picture, or when predFlagLX is equal to 1 and use_integer_mv_flag is equal to 1, the luma motion vector mvLX is derived as follows:

uLX[ 0 ] = ( ( ( mvpLX[ 0 ] >> 2 ) + mvdLX[ 0 ] ) << 2 + $2^{16}$ ) % $2^{16}$
mvLX[ 0 ] = ( uLX[ 0 ] >= $2^{15}$ ) ? ( uLX[ 0 ] − $2^{16}$ ) : uLX[ 0 ]
uLX[ 1 ] = ( ( mvpLX[ 0 ] >> 2 ) + mvdLX[ 0 ] ) << 2 + $2^{16}$ ) % $2^{16}$
mvLX[ 1 ] = ( uLX[ 1 ] >= $2^{15}$ ) ? ( uLX[ 1 ] − $2^{16}$ ) : uLX[ 1 ]

Again, the resulting values of mvLX[0] and mvLX[1] as specified above will always be in the range of $-2^{15}$ to $2^{15}-1$, inclusive. Similarly, the clipping process as shown in Table 1C will not be performed.

Table 8A is related to MV with integer resolution and Table 8B is related to MV with quarter-pel resolution and BV derivation. Again, the clipping process as shown in Table 1C is not needed.

In the second embodiment of BV/MV resolution harmonization/unification, the derivation process of a block vector and a motion vector is unified. In other words, when use_integer_mv_flag is true, all vectors (i.e., block vector and motion vector) will use integer resolution. When use_integer_mv_flag is false, all vectors (i.e., block vector and motion vector) will use quarter-pel resolution. Furthermore, the first embodiment of harmonized/unified BV/MV resolution mentioned above can be combined with the second embodiment. Accordingly, regardless of the value of use_integer_mv_flag, both decoded block vector and motion vector will be stored in quarter-pel resolution according to the combined approach. When used as a vector predictor to predict an integer vector, both decoded block vector and motion vector will be converted to integer resolution. For example, both decoded block vector and motion vector can be right shifted by N bits (e.g. N=2 for HEVC) to be in integer resolution before the prediction is applied.

An exemplary BV/MV resolution harmonization/unification incorporating an embodiment of the present invention is shown as shown in Table 9A.

TABLE 9A

When predFlagLX is equal to 1, the luma motion vector mvLX is derived as follows:

uLX[ 0 ] = ( ( ( ( mvpLX[ 0 ] >> ( 2*use_integer_mv_flag ) ) + mvdLX[ 0 ] ) <<
        (2*use_integer_mv_flag ) ) + $2^{16}$ ) % $2^{16}$
mvLX[ 0 ] = ( uLX[ 0 ] >= $2^{15}$ ) ? ( uLX[ 0 ] − $2^{16}$ ) : uLX[ 0 ]
uLX[ 1 ] = ( ( ( ( mvpLX[ 1 ] >> ( 2*use_integer_mv_flag ) ) + mvdLX[ 1 ] ) <<
        2*use_integer_mv_flag ) ) + $2^{16}$ ) % $2^{16}$
mvLX[ 1 ] = ( uLX[ 1 ] >= $2^{15}$ ) ? ( uLX[ 1 ] − $2^{16}$ ) : uLX[ 1 ]

Table 9A is related to unified MV derivation and BV derivation. The derivation of the luma motion vector mvLX for predFlagLX equal to 1 and the reference picture being the current picture as described in Table 1B is skipped due to the unified derivation. Furthermore, the clipping process as shown in Table 1C will not be performed.

Another exemplary harmonized/unified BV/MV resolution incorporating an embodiment of the present invention is shown as shown in Table 10A and Table 10B.

TABLE 10A

When predFlagLX is equal to 1 and use_integer_mv_flag is equal to 0, the luma motion vector mvLX is derived as follows:

uLX[ 0 ] = ( mvpLX[ 0 ] + mvdLX[ 0 ] + $2^{16}$ ) % $2^{16}$
mvLX[ 0 ] = ( uLX[ 0 ] >= $2^{15}$ ) ? ( uLX[ 0 ] − $2^{16}$ ) : uLX[ 0 ]
uLX[ 1 ] = ( mvpLX[ 1 ] + mvdLX[ 1 ] + $2^{16}$ ) % $2^{16}$
mvLX[ 1 ] = ( uLX[ 1 ] >= $2^{15}$ ) ? ( uLX[ 1 ] − $2^{16}$ ) : uLX[ 1 ]

TABLE 10B

When predFlagLX is equal to 1 and use_integer_mv_flag is equal to 1, the luma motion vector mvLX is derived as follows:

uLX[ 0 ] = ( ( ( mvpLX[ 0 ] >> 2 ) + mvdLX[ 0 ] ) << 2 + $2^{16}$ ) % $2^{16}$
mvLX[ 0 ] = ( uLX[ 0 ] >= $2^{15}$ ) ? ( uLX[ 0 ] − $2^{16}$ ) : uLX[ 0 ]
uLX[ 1 ] = ( ( mvpLX[ 0 ] >> 2 ) + mvdLX[ 0 ] ) << 2 + $2^{16}$ ) % $2^{16}$
mvLX[ 1 ] = ( uLX[ 1 ] >= $2^{15}$ ) ? ( uLX[ 1 ] − $2^{16}$ ) : uLX[ 1 ]

Table 10A and Table 10B are similar to Table 1A and Table 1B respectively. However, the syntax in Table 10A and Table 10B are applied to vectors according to use_integer_mv_flag being 0 (i.e., Table 10A) or 1 (i.e., Table 10B) regardless of the vector being MV or BV. The clipping process as shown in Table 1C will not be performed.

In the third embodiment of BV/MV resolution harmonization/unification, the syntax and semantics of use_integer_mv_flag and motion_vector_resolution_control_idc are modified to resolve the BV/MV resolution issue. Some examples incorporating this embodiment are described as follows:

In the first example, use_integer_mv_flag equal to 1 specifies that the motion vector resolution is integer in the decoding process of the current slice. use_integer_mv_flag equal to 0 specifies that the motion vector resolution is quarter-pixel in the decoding process of current slice. When not present, use_integer_mv_flag is inferred as motion_vector_resolution_control_idc. The motion vector points to a reference picture other than current picture.

In the second example, the value of use_integer_mv_flag is inferred when one of the following statements is true:
1. motion_vector_resolution_control_idc is not equal to 2
2. motion_vector_resolution_control_idc is equal to 2 (i.e., slice level adaptive), current picture is used as a reference picture, and it is the only reference picture for the slice.

An exemplary syntax table description incorporating this embodiment is shown in Table 11.

TABLE 11 if( motion_vector_resolution_control_idc = = 2 &&
    ( !curr_pic_as_ref_enabled_flag || NumPicTotalCurr > 1 ) )
  use_integer_mv_flag In the above example, additional condition (i.e., && (!curr_pic_as_ref_enabled_flag || NumPicTotalCurr>1)) is added for signaling use_integer_mv_flag. This additional condition corresponds to that the current picture is the only reference picture for this slice.

In the third example, use_integer_mv_flag equal to 1 specifies that the motion vector resolution is integer in the decoding process of current slice. use_integer_mv_flag equal to 0 specifies that the motion vector resolution is quarter-pixel in the decoding process of current slice. When not present, the value of use_integer_mv_flag is inferred as follows:
When curr_pic_as_ref_enabled_flag is equal to 0, it is inferred to be equal to motion_vector_resolution_control_idc.
Otherwise, it is inferred to to be 1.

In the fourth example, use_integer_mv_flag equal to 1 specifies that the motion vector resolution is integer in the decoding process of current slice. use_integer_mv_flag equal to 0 specifies that the motion vector resolution is quarter-pixel in the decoding process of the current slice. When not present, the value of use_integer_mv_flag is inferred to be equal to motion_vector_resolution_control_idc. When curr_pic_as_ref_enabled_flag is equal to 1 and NumPicTotalCurr is equal to 1 (i.e., the current reference picture being the only reference picture), the value of use_integer_mv_flag shall be 1.

In the fifth example, the motion vector pointing to the current picture shall be in integer resolution when current picture is used as the reference picture (i.e., curr_pic_as_ref_enabled_flag equal to 1).

In the sixth example, use_integer_mv_flag shall not be 0 if the block vector is always at integer resolution. It is a requirement of bitstream conformance regarding the case that when current picture is used as the reference picture (curr_pic_as_ref_enabled_flag is equal to 1), the motion vector resolution for the sequence shall not be at quarter-pel resolution. In other words, motion_vector_resolution_control_idc shall not be 0.

In the sixth embodiment of BV/MV resolution harmonization/unification, the DPB size management for IntraBC coded blocks is disclosed as follows:

In the first example, when both filtered and unfiltered versions of current picture are placed into the DPB before the decoding of current picture, the DPB size (maxDpbPicBuf) is kept unchanged.

In the second example, the filtered version of current picture is placed into the DPB before the decoding of current picture while the other hand, the unfiltered picture is not placed into DPB. Alternatively, the unfiltered version of current picture can be placed into the DPB before the decoding of current picture while the filtered picture is not put into DPB. In both cases, the maxDpbPicBuf is modified as maxDpbPicBuf−curr_pic_as_ref_enabled_flag. If curr_pic_as_ref_enabled_flag is equal to 1, one buffer is reserved for the one version that is not in DPB. The flag curr_pic_as_ref_enabled_flag can be incorporated in a sequence level, picture level or slice level flag indicating that the current picture may be used as reference picture for a whole corresponding sequence/picture/slice.

In the third example, the filtered version of current picture is placed into the DPB before the decoding of current picture while the unfiltered picture is not put into DPB. Alternatively, the unfiltered version of current picture can be placed into the DPB before the decoding of current picture while the filtered picture is not put into DPB. In both cases the maxDpbPicBuf is modified as maxDpbPicBuf−1. One buffer is reserved for the one version that is not in DPB.

Figure 4:
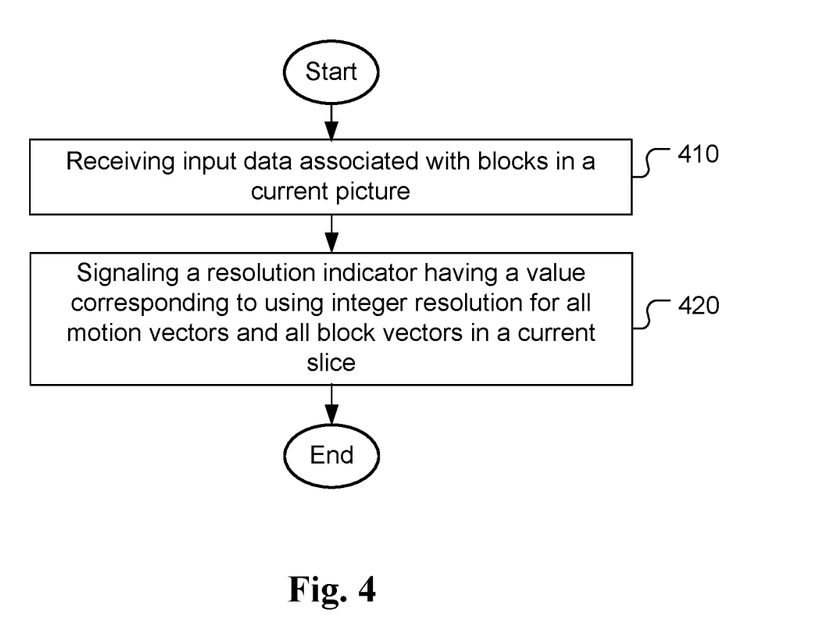
FIG. 4 illustrates a flowchart of an exemplary coding system incorporating an embodiment of the present invention, where the system uses coding modes including IntraBC mode (Intra-block copy mode) and inter prediction mode for a picture.

FIG. 4 illustrates a flowchart of an exemplary coding system incorporating an embodiment of the present invention, where the system uses coding modes including IntraBC mode (Intra-block copy mode) and inter prediction mode for a picture. The system receives input data associated with blocks in a current picture as shown in step 410. For encoding, the input data corresponds to pixel data to be encoded. For decoding, the input data corresponds to coded pixel data to be decoded. The input data may be retrieved from memory (e.g., computer memory, buffer (RAM or DRAM) or other media) or from a processor. In step 420, a resolution indicator having a value corresponding to using integer resolution is signaled for all motion vectors and all block vectors in the current slice.

Figure 5:
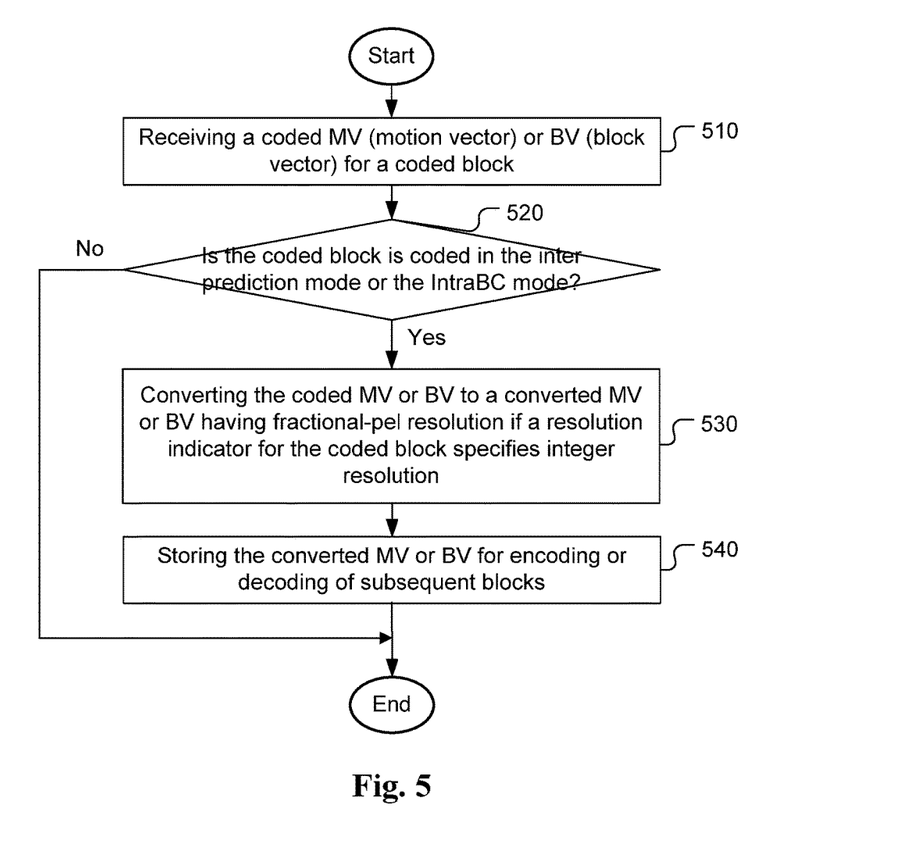
FIG. 5 illustrates a flowchart of another exemplary coding system incorporating an embodiment of the present invention, where the system uses coding modes including IntraBC mode (Intra-block copy mode) and inter prediction mode for a picture.

FIG. 5 illustrates a flowchart of an exemplary coding system incorporating an embodiment of the present invention, where the system uses coding modes including IntraBC mode (Intra-block copy mode) and inter prediction mode for a picture. The system receives a coded MV (motion vector) or BV (block vector) for a coded block as shown in step 510. The input data may be retrieved from memory (e.g., computer memory, buffer (RAM or DRAM) or other media) or from a processor. Whether the coded block is coded in the inter prediction mode or the IntraBC mode is checked in step 520. If the result is "yes", step 530 and step 540 are performed. Otherwise (i.e., the "No" path), step 530 and step 540 are skipped. In step 530, the coded MV or BV is converted to a converted MV or BV having fractional-pel resolution if a resolution indicator for the coded block specifies integer resolution. In step 540, the converted MV or BV is stored for encoding or decoding of subsequent blocks.

The flowcharts shown above are intended to illustrate examples of IntraBC coding and inter coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, implemented in a processor circuit of a video processing chip, using coding modes including IntraBC mode (Intra-block copy mode) and inter prediction mode for a picture, wherein a motion vector is allowed to use integer resolution or fractional-pel resolution, the method comprising:
  receiving by the processor circuit input data associated with blocks in a current picture; and
  signaling by the processor circuit a resolution indicator having a value corresponding to using integer resolution for all motion vectors and all block vectors in a current slice.

2. The method of claim 1, wherein if the current picture is an only reference picture for the current slice, the resolution indicator in a coded bitstream associated with the current slice must have the value corresponding to using integer resolution for all motion vectors and all block vectors in the current slice.

3. The method of claim 2, wherein when the current picture referring to a SPS (sequence parameter set) is allowed to be included in a reference picture list of the current picture, a resolution control indicator in the SPS must not set to a value to allow the fractional-pel resolution for a sequence containing the current slice.

4. The method of claim 2, wherein if the current picture is the only reference picture for the current slice, skip signaling the resolution indicator.

5. The method of claim 1, wherein the resolution indicator corresponds to a syntax element use_integer_mv_flag, wherein use_integer_mv_flag equal to 1 specifies the integer resolution and use_integer_mv_flag equal to 0 specifies the fractional-pel resolution.

6. A method of video coding using coding modes including IntraBC mode (Intra-block copy mode) and inter prediction mode, wherein a motion vector is allowed to use integer resolution or fractional-pel resolution, the method comprising:
  receiving a coded MV (motion vector) or BV (block vector) for a coded block; and
  if the coded block is coded in the inter prediction mode or the IntraBC mode:
    converting the coded MV or BV to a converted MV or BV having fractional-pel resolution if a resolution indicator for the coded block specifies integer resolution; and
    storing the converted MV or BV for encoding or decoding of subsequent blocks.

7. The method of claim 6, wherein said converting the coded MV or BV comprising left-shifting the coded MV or BV by N bits, wherein N is a positive integer.

8. The method of claim 6, wherein the converted MV or BV is clipped before the converted MV or BV is stored.

9. The method of claim 6, further comprising:
  receiving input data associated with a current MV or BV of a current block in a current picture;
  determining a MV or BV predictor for the current MV or BV, wherein the MV or BV predictor corresponds to a previously coded MV or BV stored in the fractional-pel resolution; and
  if the current block is coded in the IntraBC mode or the inter prediction mode and a current resolution indicator for the current block specifies the integer resolution:
    converting the MV or BV predictor into an integer-resolution MV or BV predictor; and
    encoding or decoding the current MV or BV using the integer-resolution MV or BV predictor.

10. The method of claim 9, wherein said converting the MV or BV predictor into an integer-resolution MV or BV predictor comprises right-shifting the MV or BV predictor by N bits, wherein N is a positive integer.

11. The method of claim 9, wherein the integer-resolution MV or BV predictor is clipped before the integer-resolution MV or BV predictor is used for encoding or decoding the current MV or BV.

12. A method of video coding using coding modes including IntraBC mode (Intra-block copy mode) and inter prediction mode, wherein a motion vector is allowed to use integer resolution or fractional-pel resolution, the method comprising:

receiving input data associated with a current vector of a current block in a current picture, wherein the current vector correspond to a MV (motion vector) or BV (block vector); and if the current block is coded in the IntraBC mode or the inter prediction mode, encoding or decoding the current vector using a same resolution regardless of whether the current vector corresponds to one MV or one BV, or encoding or decoding the current block according to the current vector using the same resolution regardless whether the current vector corresponds to one MV or one BV.

13. The method of claim 12, further comprising:

if the current block is coded in the IntraBC mode or the inter prediction mode:

converting the current vector to a converted vector having fractional-pel resolution if a resolution indicator for the current block specifies integer resolution; and storing the converted vector for encoding or decoding of subsequent blocks or subsequent vectors.

14. The method of claim 13, wherein the resolution indicator is inferred to have a value specifying the integer resolution.

15. The method of claim 13, wherein the resolution indicator corresponds to a first syntax element, use_integer_mv_flag signaled in a slice level and the resolution control indicator corresponds to a second syntax element, motion_vector_resolution_control_idc signaled in a sequence level.

16. The method of claim 13, wherein a single resolution is always determined as the integer resolution if a current picture is an only reference picture for the slice.

17. The method of claim 16, wherein the resolution indicator is set to specify to use the integer resolution or signaling of the resolution indicator is skip if the current picture is the only reference picture for the slice.

* * * * *